(12) United States Patent
Gruson

(10) Patent No.: US 9,371,192 B2
(45) Date of Patent: Jun. 21, 2016

(54) CONTAINER-TREATMENT INSTALLATION HAVING HOLDER DEVICES CONFIGURED TO CO-OPERATE MUTUALLY

(71) Applicant: Serac Group, La Ferte Bernard (FR)

(72) Inventor: Bertrand Gruson, Breville sur Mer (FR)

(73) Assignee: SERAC GROUP, La Ferte Bernard (FR)

( * ) Notice: Subject to any disclaimer, the term of this patent is extended or adjusted under 35 U.S.C. 154(b) by 104 days.

(21) Appl. No.: 14/261,145

(22) Filed: Apr. 24, 2014

(65) Prior Publication Data

US 2014/0318079 A1    Oct. 30, 2014

(30) Foreign Application Priority Data

Apr. 24, 2013    (FR) ...................................... 13 53750

(51) Int. Cl.
  *B65G 47/52*    (2006.01)
  *B65G 47/86*    (2006.01)
(52) U.S. Cl.
  CPC .............. *B65G 47/52* (2013.01); *B65G 47/847* (2013.01); *B65G 2201/0244* (2013.01)
(58) Field of Classification Search
  CPC ..................................................... B65G 47/847
  USPC .......... 198/468.2, 468.9, 470.1, 476.1, 477.1; 294/106
  See application file for complete search history.

(56) References Cited

U.S. PATENT DOCUMENTS

2010/0294622 A1\* 11/2010 Graffin .................... B67C 7/004
                                                                   198/470.1

FOREIGN PATENT DOCUMENTS

DE           10146118 A1     4/2003
EP            1939117 A1     7/2008
WO       WO 02/090220 A1    11/2002

\* cited by examiner

*Primary Examiner* — Gene Crawford
*Assistant Examiner* — Lester Rushin
(74) *Attorney, Agent, or Firm* — Muncy, Geissler, Olds & Lowe, P.C.

(57) ABSTRACT

An installation comprising a first platform having a first holder device comprising a first pair of jaws, and a second platform having a second holder device comprising a second pair of jaws. Each pair of jaws comprising a stationary jaw and a movable jaw mounted on the stationary jaw to be movable between a closed position and an open position. A resilient element connecting the two jaws together urges the movable jaw towards the closed position. The two pairs of jaws are provided with co-operation devices enabling them to transfer a container from one platform to another by co-operation between the pairs of jaws.

12 Claims, 6 Drawing Sheets

Variant A
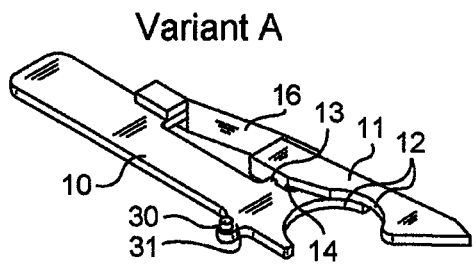
Fig. 6a  Fig. 6b
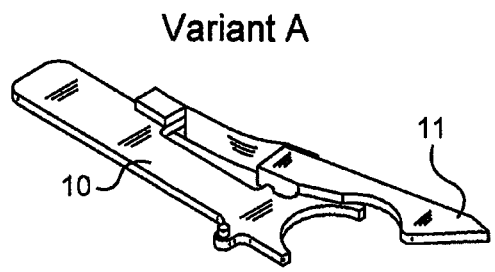
Variant B
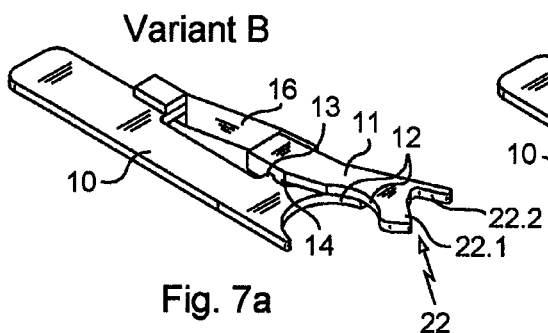
Fig. 7a  Fig. 7b
Variant C
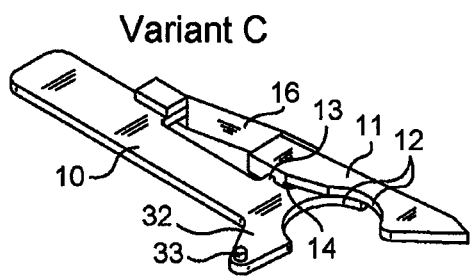
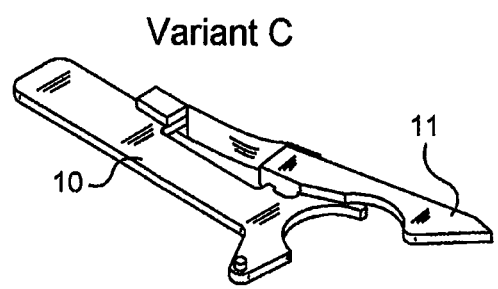
Fig. 8a  Fig. 8b
Variant D
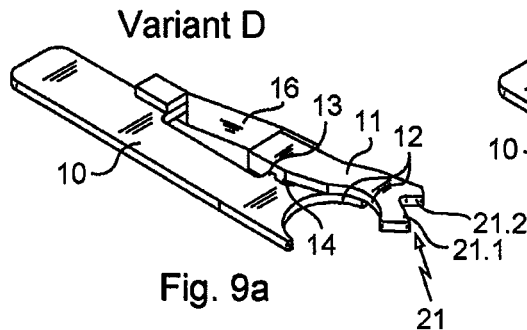
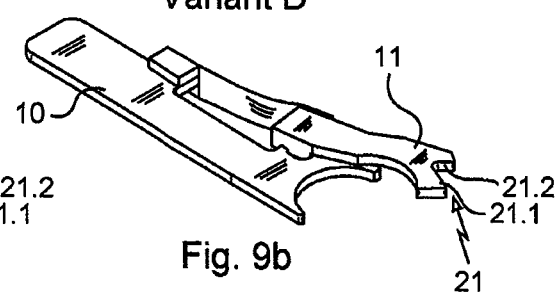
Fig. 9a  Fig. 9b Variant E Variant F Variant G Variant H

CONTAINER-TREATMENT INSTALLATION HAVING HOLDER DEVICES CONFIGURED TO CO-OPERATE MUTUALLY

The invention relates to a container-treatment installation having holder devices configured to co-operate mutually.

TECHNOLOGICAL BACKGROUND OF THE INVENTION

Container-treatment installations are known, such as, by way of example, installations for filling and closing containers, and possibly also for previously washing and rinsing containers, or indeed sterilizing containers. Such installations have a plurality of rotary platforms that are fitted with container holder devices and that are located adjacent to one another so as to define a travel path for the containers through the corresponding installation. Each holder device is arranged to take hold of the body or the rim of a container in order to hold the container during movement of the corresponding platform.

By way of example, there exist holder devices in the form of clamps comprising a stationary jaw and a movable jaw hinged to the stationary jaw via a pivot pin so that the movable jaw pivots between an open position and a position for closing the holder device. The opening of the holder device is usually controlled by a wheel secured to the movable jaw, which wheel co-operates with a cam secured to the corresponding platform.

Installing cam paths is relatively constraining and makes the structure of the installation more complex.

Furthermore, it is necessary to clean container-treatment installations regularly, in particular installations used for packaging foodstuffs.

Nevertheless, it has been found that dirt and other impurities tend to accumulate on the cam and the wheel. Unfortunately, those parts are difficult to clean because they are difficult of access, in particular when the holder device is fastened to the bottom portion of the corresponding platform.

In particular, certain installations are fitted with a cleaning circuit provided with nozzles for spraying a cleaning solution onto the various parts of the installation. Nevertheless, that cleaning circuit is ineffective for cleaning wheel-and-cam systems of holder devices and the associated platforms without using a large number of nozzles that are aimed specifically at said wheel-and-cam systems.

That drawback is particularly disadvantageous if the treatment installation is used in the agrifood business where hygiene standards are particularly strict.

OBJECT OF THE INVENTION

An object of the invention is to propose a container-treatment installation having container holder devices that are simpler to actuate and to clean.

BRIEF SUMMARY OF THE INVENTION

To this end, the invention provides an installation for treating containers, the installation comprising at least a first platform having at least a first holder device comprising a first pair of jaws, and a second platform having at least a second holder device comprising a second pair of jaws, each pair of jaws comprising a stationary jaw, a movable jaw movable between a closed position for holding a container and an open position for releasing the container, and a resilient element arranged to urge the movable jaw towards the closed position.

According to the invention, the two pairs of jaws are provided with co-operation means to enable them, in operation, to transfer a container from one platform to another by co-operation between the pairs of jaws, the co-operation means being configured so that one of the pairs of jaws can act on the movement of the movable jaw of the other pair of jaws relative to the corresponding stationary jaw.

Thus, the two pairs of jaws mounted on different platforms co-operate in order to allow a container to be transferred from one platform to another, thereby enabling the installation to be simplified greatly by making it possible to omit, in particular, the wheel-and-cam systems of the prior art. The installation is thus much simpler and quicker to clean.

Furthermore, since there is no need to connect the movable jaw to the associated platform in order to enable it to be actuated by a cam, the movable jaws and the stationary jaws of the holder devices of the invention are simplified in structure and it is found to be much easier to gain access to the stationary jaws and to the movable jaws. Said jaws can therefore be cleaned much more easily.

Furthermore, by simplifying the installation, and in particular by simplifying the structure of the stationary and movable jaws, it is possible to increase the reliability of the installation and to reduce the cost of fabricating it. In addition, it is possible to envisage standardizing holder devices from one embodiment of the invention to another, thereby simplifying the structure of the stationary jaws and of the movable jaws.

In a particular embodiment, the co-operation means comprise a peg that is arranged on the stationary jaw of one of the pair of jaws and a drive finger that is arranged on the movable jaw of the other pair of jaws in such a manner that the peg comes into contact with the drive finger in the vicinity of a point of tangency between the platforms.

In particular manner, the peg and the drive finger are arranged so that the co-operation between the peg and the drive finger leads to the movable jaw provided with the drive finger being moved from the closed position to the open position.

In a particular embodiment, the peg and the drive finger are arranged in such a manner that the co-operation between the peg and the drive finger causes the movable jaw provided with the drive finger to be blocked in the closed position.

In particular manner, the free end of the movable jaw forms the drive finger.

In a particular embodiment the peg is arranged on a free end of the stationary jaw.

In particular manner, the peg extends vertically from the stationary jaw on which it is arranged.

In a particular embodiment, the stationary jaw is made integrally with the corresponding platform.

In particular manner, each holder device is fastened to a bottom face of the corresponding platform, the top face of said platform, opposite from the bottom face, sloping down towards the corresponding holder device.

In a particular embodiment, the resilient element is a leaf spring having one end portion secured to the stationary jaw and another end portion secured to the movable jaw in order to carry the movable jaw.

BRIEF DESCRIPTION OF THE DRAWINGS

The invention can be better understood in the light of the following description of a non-limiting embodiment of the invention.

Reference is made to the accompanying figures, in which:

FIGS. 6a and 6b are perspective views of the holder device shown in FIGS. 2 and 3, the device being shown respectively in the closed position and in the open position;

FIGS. 7a and 7b are perspective views of the holder device shown in FIGS. 3 and 4, the device being shown respectively in the closed position and in the open position;

FIGS. 8a and 8b are perspective views of the holder device shown in FIGS. 4 and 5, the device being shown respectively in the closed position and in the open position;

FIGS. 9a and 9b are perspective views of the holder device shown in FIGS. 2 and 5, the device being shown respectively in the closed position and in the open position;

DETAILED DESCRIPTION OF THE INVENTION

Figure 1:
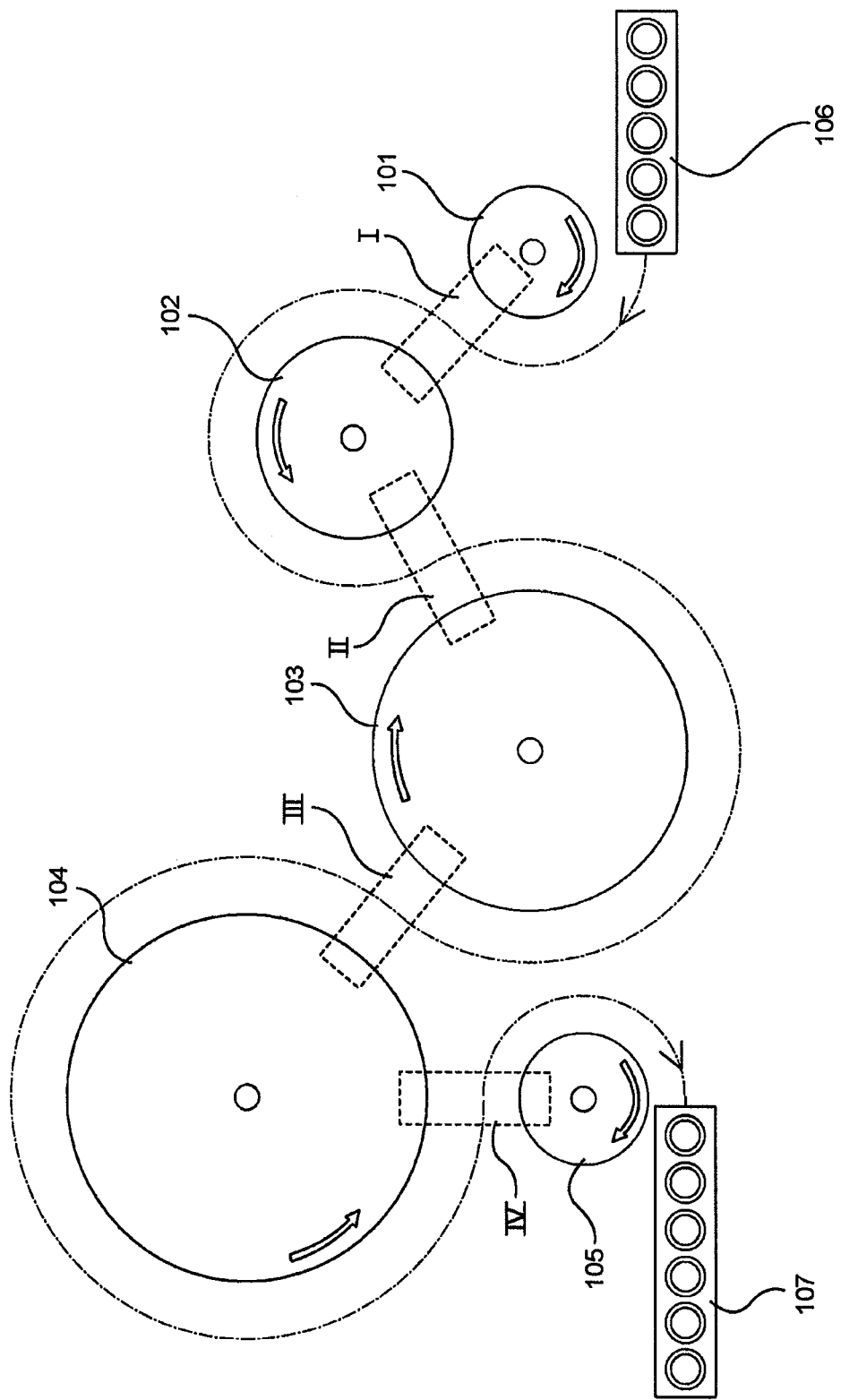
FIG. 1 is a diagrammatic plan view of a treatment installation in accordance with the invention, the holder devices of the installation not being shown.
Figure 2:
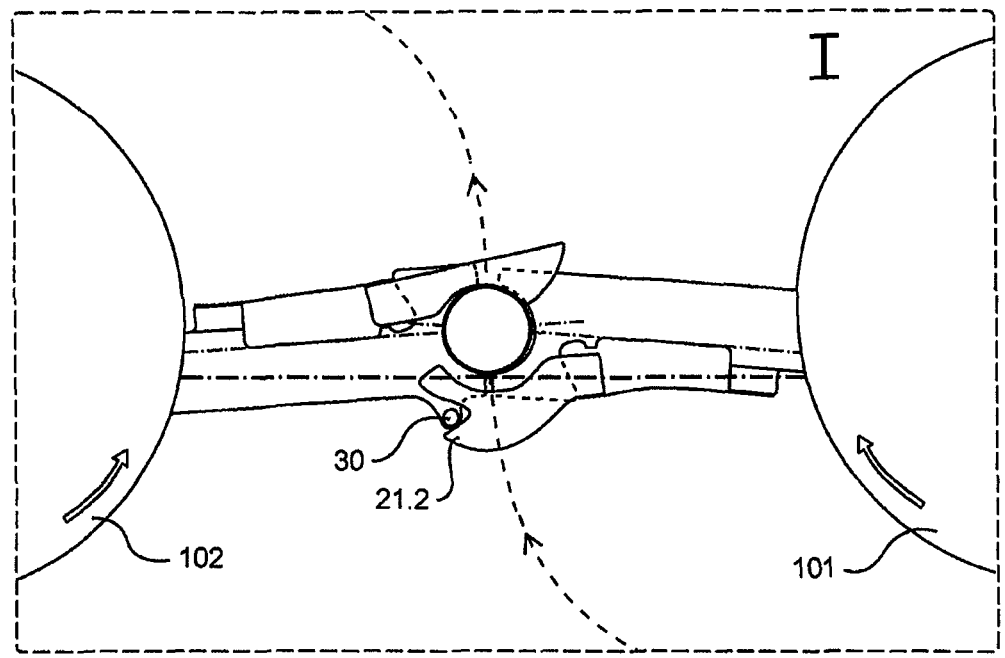
FIG. 2 is an enlarged view of zone I in FIG. 1.
Figure 3:
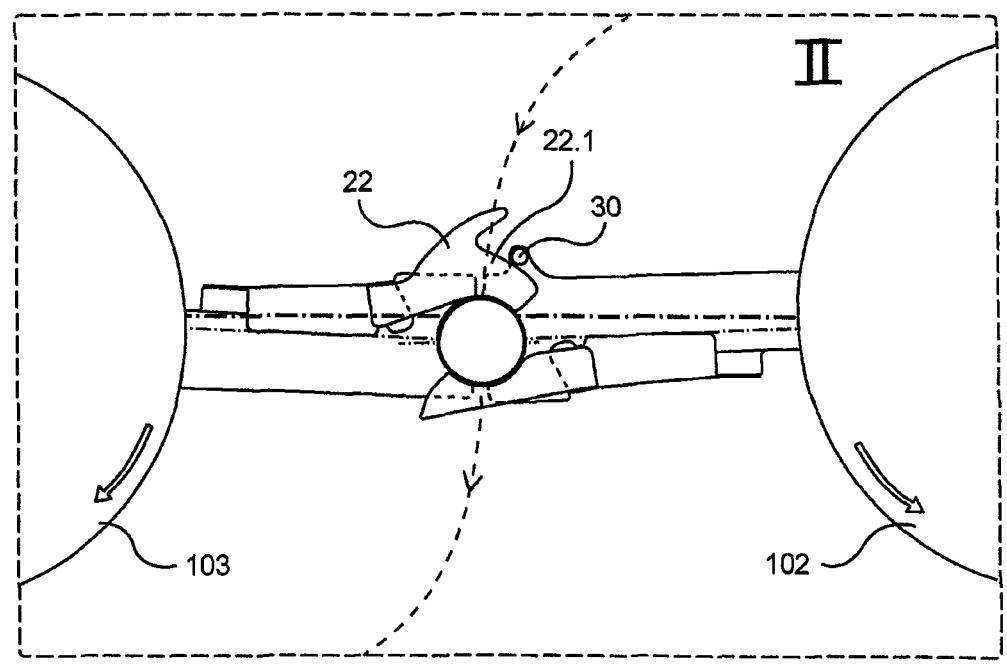
FIG. 3 is an enlarged view of zone II in FIG. 1.
Figure 4:
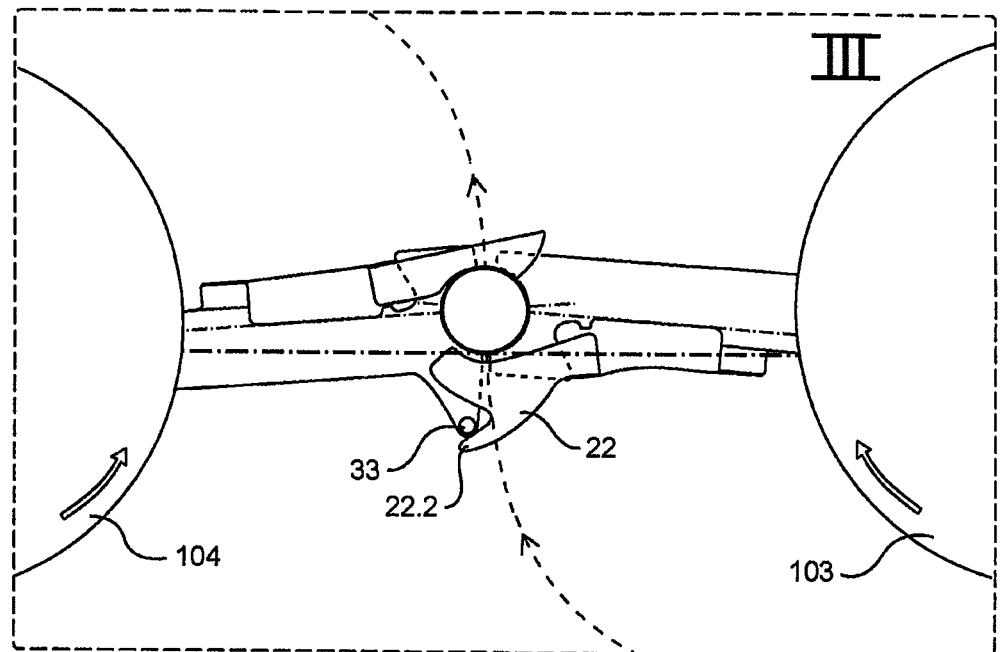
FIG. 4 is an enlarged view of zone III in FIG. 1.
Figure 5:
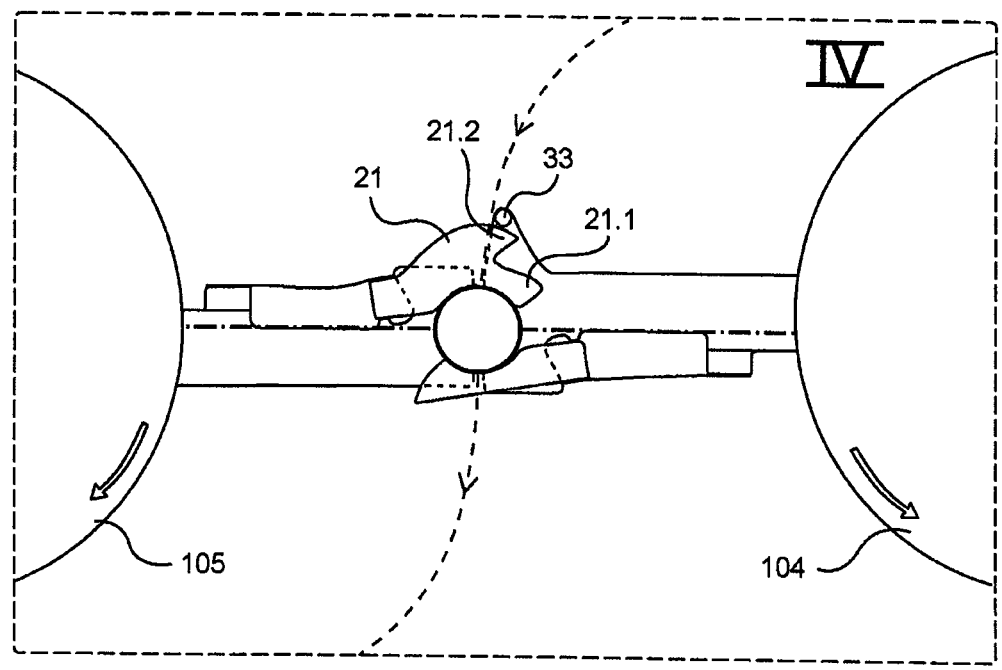
FIG. 5 is an enlarged view of zone IV in FIG. 1.
Figure 10:
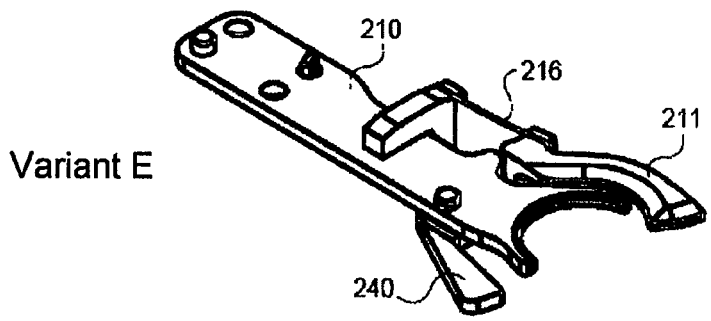
FIGS. 10 to 13 are perspective views of variants of the holder devices shown in FIGS. 2 to 9b, said variants being shown in the closed position.
Figure 11:
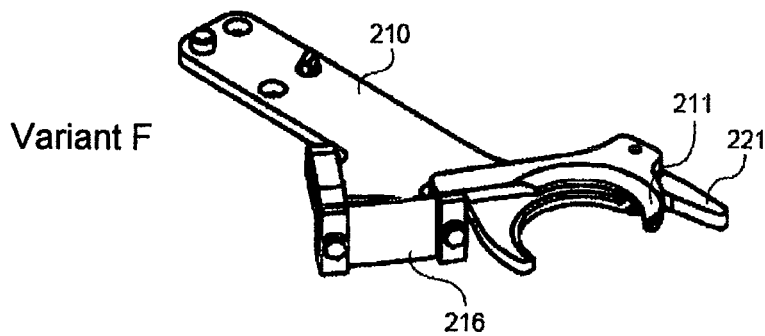
Figure 12:
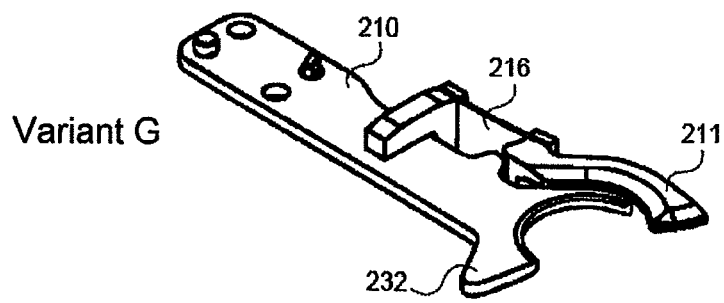
Figure 13:
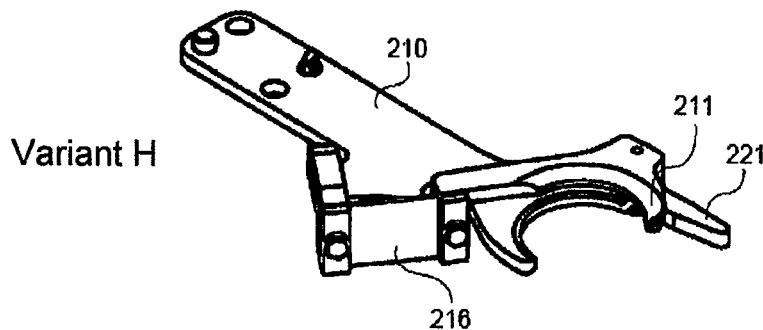

With reference to FIG. 1, the container-treatment installation of the invention in this example is for treating containers each having a body and a neck, including a collar surmounted by a rim 100.

The installation has a plurality of adjacent rotary platforms, specifically and by way of example: two transfer stars (first platform 101 at the inlet and fifth platform 105 at the outlet); a sterilization carousel (second platform 102); a filler carousel (third platform 103); and a closure carousel (fourth platform 104). The second, third, and fourth platforms 102, 103, and 104 are respectively surmounted by a sterilizer device, a filler device, and a closure device (not shown).

In this example, the installation defines a travel path 1 for the containers through the installation in such a manner that the center of the rim is centered on the path 1. The path 1 winds in part around each of the five platforms. The installation has an introducer device for inserting containers 106 into the installation, which device brings the containers to the first platform 101, and a device 107 for removing containers, which device takes charge of the containers carried by the fifth platform 105 and takes them away from the installation. By way of example, the devices 106 and 107 are transporter screws, moving belt type conveyors, or other types of device.

Each platform is provided with a plurality of holder devices enabling containers to be held by their rims 100, either by clamping directly on the rims, or else by clamping on closure members covering the rims.

Figure 14:
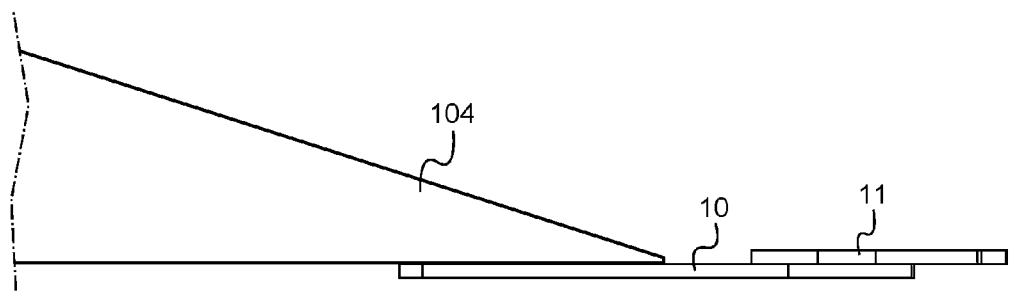
FIG. 14 is a side view of platform 104 showing the slope of the top face.

Each holder device is preferably fastened to a bottom face of the corresponding platform. As shown in FIG. 14, the top face of each platform, i.e. the face opposite from the bottom face of that platform, slopes down towards the corresponding holder devices.

As a result, if any cleaning or sterilizing fluid should be sprayed substantially towards the center of one of the platforms, said cleaning fluid will flow away naturally along the slope of the top face of the platform. The cooling fluid will then naturally spill over the edges of the platform onto the respective holder devices. Thus substantially the entire top face of the platform and a large portion of the holder devices will come into contact with the cleaning fluid. It is thus very simple to clean or to sterilize a large portion of the installation, merely by spraying the fluid to the middle of each of the platforms.

With reference to FIGS. 6a, 6b, 7a, 7b, 8a, 8b, 9a, and 9b, there follows a description of the holder devices of the different platforms. Elements that are identical from one variant to another are given the same numerical references.

Each holder device comprises a stationary jaw 10 which, in this example, is made integrally with the corresponding platform.

Each holder device also comprises a movable jaw 11 mounted on the stationary jaw 10 to be movable relative to the stationary jaw 10 between:

a closed position in which the stationary jaw 10 and the movable jaw 11 define a through section that is smaller than the cross-section of the rim 100 of the container such that in the presence of a container between the jaws of the device, the jaws clamp onto the rim 100 of the container; and an open position for releasing the container in which the free end of the movable jaw 11 is moved away from the free end of the stationary jaw 10 so as to define a through section greater than the cross-section of the rim.

Thus, the stationary jaw 10 and the movable jaw 11 do not open symmetrically relative to a radial direction of the corresponding platform: only the movable jaw 11 opens and closes relative to the stationary jaw 10 in order to hold or to release a container.

By way of example, the free end of the stationary jaw 10 and the free end of the movable jaw 11 may be provided with circular cutouts 12 for placing around the container at the rim 100. The term "free end" is naturally used to mean those portions of the jaws that are to clamp onto containers, as contrasted to those portions of the jaws that are connected to the installation or to the other jaw.

The free ends of the stationary jaw 10 and of the movable jaw 11 extend parallel relative to each other. The free end of the movable jaw 11 also extends beneath the free end of the stationary jaw 10.

The stationary jaw 10 and the movable jaw 11 are both oblong in shape.

The movable jaw 11 is preferably arranged so that on passing from the open position to the closed position, the movable jaw 11 exerts a clamping force on the container that is to be held, which force extends towards the center of the rim 100 of the container and in a direction extending transversely relative to the longitudinal direction of the stationary jaw 10.

Thus, the movable jaw 11 exerts a transverse force on the rim 100 and not a force extending in a direction perpendicular to the longitudinal direction of the stationary jaw, thus making it possible to ensure that the rim 100 is held better in the holder device.

The stationary jaw 10 preferably includes a first abutment 13 defining the closed position of the movable jaw 11. In this example, the first abutment 13 is formed directly in one of the side walls of the stationary jaw 10. The first abutment 13 co-operates with a side edge of the movable jaw 11 to stop the movement of the movable jaw 11 relative to the stationary jaw 10.

The stationary jaw 10 preferably includes a second abutment 14 defining the open position of the movable jaw 11. In this example, the second abutment 14 is formed directly in the same side wall of the stationary jaw 10 as the first abutment 13 formed therein. The second abutment 14 co-operates with a shoulder formed in the movable jaw 11 to stop the movement of the movable jaw 11 relative to the stationary jaw 10.

Preferably, each holder device also has a leaf spring 16 having an end portion secured to the corresponding stationary jaw 10 and an end portion secured to the corresponding movable jaw 11 in order to carry the movable jaw 11. The leaf spring 16 thus connects together the two jaws in order both to allow the movable jaw 11 to move relative to the stationary jaw 10, and also to urge the movable jaw 11 towards the closed position. The ends of the leaf spring 16 may be secured to the respective jaws by screws, for example.

Thus, the leaf spring on its own allows the movable blade to move relative to the stationary blade and returns the movable blade to the closed position. The holder devices of the invention thus comprise two parts and are therefore simple and quick to clean.

In addition, the leaf spring is itself found to be easy to clean. The ease of access to all of the portions of the outside surface of the blade and the simplicity of its shape enable the blade to be cleaned quickly and effectively without any need to remove the holder device.

The leaf spring 16 is preferably arranged in such a manner that the movable jaw 11 can move from the closed position (FIGS. 6a, 7a, 8a, and 9a) to an intermediate position by the movable jaw 11 pivoting about a first center of rotation situated on the first abutment 13, the leaf spring 16 deforming to make this movement possible. The leaf spring 16 is also arranged in such a manner that the movable jaw 11 moves from the intermediate position to the open position (FIGS. 6b, 7b, 8b, and 9b) by the movable jaw 11 pivoting about a second center of rotation that is offset towards the rear of the first abutment 13 and of the free ends of the jaws, the leaf spring 16 deforming even more in order to make this movement possible.

The second abutment 14 is preferably arranged to avoid plastic deformation of the leaf spring 16: when the movable jaw 11 is in the open position, the leaf spring 16 is thus subjected to elastic deformation only. The second abutment 14 is arranged in such a manner that the resultant of a force for opening the movable jaw 11 beyond the open position extends in a direction that is tangential to the leaf spring 16. This ensures that an operator does not deform the leaf spring 16 plastically by attempting to open the holder device too far manually, e.g. during a maintenance operation.

The leaf spring 16 is substantially rectangular in shape. In this example, the leaf spring 16 is of a width that extends perpendicularly to the plane of the jaws 10 and 11, and of a length that extends parallel to a longitudinal direction of the jaws. Thus, the leaf spring 16 is arranged so that the bending axis of the leaf spring 16 is parallel to the axis of rotation of the movable jaw 11 about the first center of rotation and to the axis of rotation of the movable jaw 11 about the second center of rotation.

It may be necessary to place the treatment installation in a controlled-atmosphere enclosure, with a controlled stream of gas then flowing from the ceiling of the enclosure towards the treatment installation. The way the leaf spring 16 is arranged thus makes it possible to ensure that the leaf spring 16 disturbs the flow of this stream very little compared with a leaf spring extending in the same plane as the stationary jaw 10 and the movable jaw 11.

In addition, because of this arrangement of the leaf spring 16, both of the two main faces of the leaf spring 16, i.e. the two faces of the leaf spring having the greatest areas and that are substantially vertical, can be exposed to fluids falling from the top face of the corresponding platform. This is particularly advantageous when the fluid is a cleaning or sterilizing fluid that can then serve to treat both main faces of the leaf spring.

The leaf spring 16 is large in width. The term "large" should be understood to mean that the leaf spring 16 has a width that is greater than one-third of the length of the leaf spring 16.

Thus, the leaf spring 16 can stabilize the movable jaw 11 relative to the stationary jaw 10 more easily, thereby limiting any parasitic movements of the movable jaw 11 relative to the stationary jaw 10, other than movements in rotation of the movable jaw 11 about the two centers of rotation. The leaf spring 16 also makes it possible to omit any rubbing guide pin of the kind used in prior art holder devices, where such a rubbing guide pin is usually difficult to clean.

In the invention, for each holder device of the first platform 101, the jaws of the holder devices of the first platform 101 and the jaws of the holder devices of the second platform 102 are provided with co-operation means enabling them to co-operate for the purpose, in operation, of transferring a container from the first platform 101 to the second platform 102 merely by the jaws co-operating. In addition, the jaws of the holder devices of the second platform 102 and the jaws of the holder devices of the third platform 103 are provided with co-operation means enabling them to co-operate for the purpose, in operation, of transferring a container from the second platform 102 to the third platform 103 merely by the jaws co-operating. Furthermore, the jaws of the holder devices of the first platform 103 and the jaws of the holder devices of the fourth platform 104 are provided with co-operation means enabling them to co-operate for the purpose, in operation, of transferring a container from the third platform 103 to the fourth platform 104 merely by the jaws co-operating. Finally, the jaws of the holder devices of the fourth platform 104 and the jaws of the holder devices of the fifth platform 105 are provided with co-operation means enabling them to co-operate for the purpose, in operation, of transferring a container from the fourth platform 104 to the fifth platform 105 merely the jaws co-operating.

More particularly, the holder devices of any one platforms are all identical. The various holder devices of a single platform are configured to be capable of co-operating with any of the holder devices of consecutive platform(s).

To this end, and with reference to FIGS. 9a and 9b, the holder devices of the first platform 101 and of the fifth platform 105 all have the same co-operation means that are referred to below as variant D holder devices. The co-operation means of the variant D holder devices comprise a drive finger 21 that is arranged on the movable jaw 11 of each of said devices.

The drive finger 21 is preferably formed directly by a cutout in the free end of the movable jaw 11. The drive finger 21 thus extends parallel to the remainder of the free end. The free end is shaped so that the drive finger 21 has a portion 21.1 for extending around the rim and a portion 21.2 that diverges from the portion 21.1 to co-operate with the portion 21.1 to form a V-shape.

With reference to FIGS. 7a and 7b, the holder devices of the third platform 103 all have the same co-operation means and are referred to below as variant B holder devices. The variant B holder devices differ from the variant D holder devices in the shape of their drive finger, which is given reference 22, in which the portions 22.1 and 22.2 form a V-shape that is somewhat deeper and more widely spread out than the V-shape formed by the portions 21.1 and 21.2 of the drive fingers 21 of the variant D holder devices. More precisely, the portion 22.2 is spaced further away and is longer than the portion 21.2.

With reference to FIGS. 6a and 6b, the holder devices of the second platform 102 all have the same co-operation means and they are referred to below as variant A holder devices. The co-operation means of the variant A holder devices have a peg 30 that is arranged on the stationary jaw 10 of each of said devices.

More particularly, each free end of the stationary jaw 10 includes a projection 31 extending in the same plane as the remainder of the free end and perpendicularly to the longitudinal direction of the stationary jaw 10. The peg 30 in this example is mounted on the projection 31 so as to extend vertically from said projection 31.

With reference to FIGS. 8a and 8b, the holder devices of the fourth platform 104 all have the same co-operation means and are referred to below as variant C holder devices. The variant C holder devices differ from the variant A holder devices in the arrangement of the projection, which is given reference 32, and which carries a peg given reference 33. Specifically in this example, the projection 32 of the variant C extends consecutively from the circular cutout in the stationary jaw 10 so that the peg 33 is further away from the platform 104 on which the variant C holder device is fastened than is the peg 30 from the platform 102 carrying the variant A holder device. In addition, the projection 32 of the variant C is longer, such that the peg 33 is further away from the remainder of the free end than in variant A.

The path of a container through the installation is described below with reference to FIGS. 1, 2, 3, 4, 5, 6a, 6b, 7a, 7b, 8a, 8b, 9a, and 9b.

The container is loaded into the first platform 101 by the introducer device which forces the rim 100 of the container into one of the variant D holder devices of the first platform 101. The variant D holder device then clamps onto the container so as to hold the container around the first platform 101.

As the variant D holder device carrying the container comes closer to the point of tangency of the first platform 101 with the second platform 102, the variant D holder device carrying the container comes to face one of the variant A holder devices of the second platform 102 such that at the point of tangency the container is loaded into both holder devices. More precisely, the free end of the movable jaw 11 of the variant A holder device of the second platform 102 and the stationary jaw 10 of the variant D holder device pass one over the other and the movable jaw 11 of the variant A holder device is moved by the rim of the container from the closed position to the open position under the action of the container moving along its path. The leaf spring 16 of the variant A holder device then returns the movable jaw 11 of the variant A holder device to the closed position so that at the point of tangency between the first platform and the second platform (FIG. 2), both the variant A and the variant D holder devices are clamped onto the container and each of them is thus capable of holding the container.

With continuing rotary movement of the platforms, the peg 30 of the variant A holder device comes into contact with the portion 21.2 of the drive finger 21 of the variant D holder device. As the variant A and variant D holder devices move away from the point of tangency, the peg 30 exerts pressure on the portion 21.2 of the drive finger 21 so as to move the movable jaw 11 of the variant D holder device from its closed position to its open position. The variant A holder device thus releases the container from the variant D holder device: only the variant A holder device is then clamped onto the container and the container can continue its path through the installation by moving around the second platform 102.

As the variant A holder device approaches the point of tangency between the second platform 102 and the third platform 103, the variant A holder device carrying the container comes up to one of the variant B holder devices of the third platform 103. The free end of the stationary jaw 10 of this variant B holder device of the third platform 103 and the movable jaw 11 of the variant A holder device pass one over the other, and the movable jaw 11 of the variant B holder device is moved by the rim of the container from the closed position to the open position under the action of the container moving along its path. The leaf spring 16 of the variant B device then brings the movable jaw 11 of the variant B device into the closed position so that at the point of tangency between the second and third platforms (FIG. 3), both the variant A holder device and the variant B holder device are clamping onto the container, and each of them is thus capable of holding the container. The peg 30 of the variant A holder device comes into contact with the portion 22.1 of the drive finger 22 of the variant B holder device. As the variant A and variant B holder devices move away from the point of tangency, the peg 30 exerts pressure on the portion 22.1 of the drive finger 22 such that the peg 30 holds the movable jaw 11 of the variant B holder device in the closed position, while the movable jaw 11 of the variant A holder device is moved by the rim from its closed position to its open position under the action of the container moving along its path around the third platform 103. Thus, only the variant B holder device is clamped onto the container and the container can continue to follow its path through the installation by moving around the third platform 103.

In the same manner, as the variant B holder device approaches the point of tangency between the third platform 103 and the fourth platform 104, the movable jaw 11 of the variant C holder device is moved from the closed position to the open position by the rim under the action of the container moving. The leaf spring 16 of the variant C device then brings the movable jaw 11 of the variant C device into the closed position, such that at the point of tangency between the third platform 103 and the fourth platform 104 (FIG. 4), both the variant B and the variant C holder devices are clamped onto the container. As the variant B and variant C holder devices move away from the point of tangency, the peg 33 of the variant C device exerts pressure on the portion 22.2 of the drive finger 22 so that the peg 33 moves the movable jaw 11 of the variant B holder device from its closed position to its open position. As a result, only the variant C holder device is clamped onto the container and the container can continue its path through the installation by moving around the fourth platform 104.

Finally, as the variant C holder device approaches the point of tangency between the fourth platform 104 and the fifth platform 105, the movable jaw 11 of the variant D holder device is moved from the closed position to the open position by the rim under the action of the container moving. The leaf spring 16 of the variant D device then brings the movable jaw of the variant D device into the closed position such that, at the point of tangency between the fourth platform 104 and the fifth platform 105 (FIG. 5), both the variant C and the variant D holder devices are clamped onto the container. The peg 33 exerts pressure on the portion 21.2 of the drive finger 21 so as to hold the movable jaw 11 of the variant D holder device in the closed position, the movable jaw 11 of the variant C holder device being moved by the rim from its closed position to its open position under the action of the container moving. Thus only the variant D holder device is clamped onto the container and the container can continue its path through the installation by moving around the fifth platform 105 prior to being unloaded by the removal device 106.

It should be observed that the various holder devices need to be arranged in the installation in such a manner that co-operation between the peg of one holder device with the drive finger of another holder device takes place only once both of the holder devices holding the container are in the vicinity of the point of tangency between the two platforms associated with said devices.

It is therefore the co-operation between the holder devices of two consecutive platforms that enables the container to move between said consecutive platforms and that thus enables the container to move through the treatment installation. In particular, each peg makes it possible to open the movable jaw 11 of the holder device of the upstream platform and to keep the movable jaw 11 of the holder device of the downstream platform closed. Each variant of the holder device is thus configured to co-operate with two other variants of the holder device.

The treatment installation of the invention thus makes it possible, advantageously, to avoid using wheel-and-cam systems. Furthermore, there is no need to connect the movable jaw 11 to the corresponding platform, thereby greatly simplifying the structure of the movable jaw 11 and also the structure of the stationary jaw 10. The movable jaw 11 and the stationary jaw 10 in this example are thus generally plane in shape. Furthermore, the movable jaw 11 is of relatively short length, thereby making it simpler to stabilize and guide by means of the leaf spring 16. The term "relatively short" is used to mean that the movable jaw 11 has a length lying in the range one-half to one-third of the length of the stationary jaw 10.

The holder devices of the invention are also very simple in structure so they present production costs that are small and they become damaged and dirtied less quickly than do devices of the prior art. They are also very simple to clean.

Naturally, the invention is not limited to the embodiment described and embodiment variants may be applied thereto without going beyond the ambit of the invention as defined by the claims.

In particular, the installation may have some other number of rotary platforms. Furthermore, the holder devices may serve to hold the containers other than via the rims of the containers, for example the containers may be held by their bodies.

Although the installations described have four variants of the holder device, with each variant of the holder device being configured to co-operate with two other variants of the holder device, installations of the invention could have only two holder device variants configured to co-operate with each other. For example, the installation could have only two platforms using only variant A holder devices and variant B holder devices.

The installation could have only two consecutive platforms fitted with holder devices configured to co-operate for the purpose of allowing a container to move from one platform to another, with the remainder of the installation relying on actuation by conventional wheel-and-cam type systems.

In any event, for each platform under consideration, each holder device should be arranged to be capable of co-operating with at least one of the holder devices of each of the platforms upstream and downstream from the platform in question in at least one direction of rotation of the platform in question.

Although the co-operation means in this example comprise peg-and-finger arrangements, the co-operation means could comprise any other means appropriate for achieving co-operation between the holder devices of upstream and downstream platforms. FIGS. 10 to 13 show variants in which the co-operation means comprise projection-and-finger arrangements that replace the above-described peg-and-finger arrangements.

The co-operation means of variant E holder devices thus comprise a plane projection 240 that is fastened to a free end of the stationary jaw 210 so that the projection 240 extends in a plane parallel to the plane in which the stationary jaw 210 extends. The co-operation means of the variant F holder devices comprise a finger 221 connected to one end of the movable jaw 211 so as to extend in a plane parallel to the plane in which the movable jaw 211 extends. The co-operation means of the variant G holder devices comprise a plane projection 232 that is formed directly by the free end of the stationary jaw 210. The co-operation means of the variant H holder devices comprise a finger 221 connected to one end of the movable jaw 211 so as to extend in a plane parallel to the plane in which the movable jaw 211 extends.

Thus, the variant E holder device is configured to co-operate with the variant H holder device via the projection 240 and the finger 221 (to move the movable jaw 211 carrying the finger 221 from the closed position to the open position). The variant F holder device is configured to co-operate with the variant G holder device via the projection 232 and the finger 221 (to cause the movable jaw 211 provided with the finger 221 to move from the closed position to the open position).

The passage of a container from the variant E holder device to the variant F holder device, and the passage of a container from the variant G holder device to the variant H holder device is ensured by wheel-and-cam type systems or by special characteristics of the leaf springs (differences of stiffness and/or orientation between the leaf springs of the holder devices of the upstream platform and the leaf springs of the holder devices of the downstream platform). The closure of the holder device may be controlled by a resilient element other than the leaf spring, such as a compression spring or a torsion spring, for example.

The holder device is preferably made entirely out of metal, in particular when it is to be used in a station for decontamination by means of an electron beam.

In a variant, in other applications, the holder device could comprise parts made of plastics material.

A jaw may be fitted with a peg passing through the jaw or with two pegs that are offset in a vertical plane in order to be capable of acting on the free jaws of holder devices of an upstream platform and on the free jaws of holder devices of a downstream platform.

The term "peg" is used to cover any element secured to the stationary jaw (whether a separate fitting or machined directly on the jaw) and having a shape suitable for co-operating with the drive fingers of holder devices of adjacent platforms.

Provision could be made for the holder devices of an upstream platform to have leaf springs of stiffness that is less than the stiffness of the leaf springs of holder devices of a downstream platform in such a manner that the holder device of the downstream platform pulls the container from the holder device of the upstream platform.

Provision could also be made for the holder devices of an upstream platform to have leaf springs extending in a direction that is less inclined relative to the direction along which the corresponding stationary jaw extends compared with the leaf springs of the holder devices of an upstream platform in such a manner that the holder devices of the downstream platform pulls the container from the holder devices of the upstream platform.

The invention claimed is:

1. An installation for treating containers, the installation comprising at least:
   a first platform having at least a first holder device comprising a first pair of jaws; and
   a second platform having at least a second holder device comprising a second pair of jaws;
   each pair of jaws comprising a stationary jaw, a movable jaw movable between a closed position for holding a container and an open position for releasing the container, and a resilient element arranged to urge the movable jaw towards the closed position, the installation being characterized in that the two pairs of jaws are provided with co-operation means to enable them, in operation, to transfer a container from one platform to another by co-operation between the pairs of jaws, the co-operation means being configured so that one of the pairs of jaws can act on the movement of the movable jaw of the other pair of jaws relative to the corresponding stationary jaw.

2. An installation for treating containers, the installation comprising at least:
   a first platform having at least a first holder device comprising a first pair of jaws; and
   a second platform having at least a second holder device comprising a second pair of jaws;
   each pair of jaws comprising a stationary jaw, a movable jaw movable between a closed position for holding a container and an open position for releasing the container, and a resilient element arranged to urge the movable jaw towards the closed position, the installation being characterized in that the two pairs of jaws are provided with co-operation means to enable them, in operation, to transfer a container from one platform to another by co-operation between the pairs of jaws, the co-operation means being configured so that one of the pairs of jaws can act on the movement of the movable jaw of the other pair of jaws relative to the corresponding stationary jaw;
   wherein the co-operation means comprise a peg that is arranged on the stationary jaw of one of the pair of jaws and a drive finger that is arranged on the movable jaw of the other pair of jaws in such a manner that the peg comes into contact with the drive finger in the vicinity of a point of tangency between the platforms.

3. An installation according to claim 2, wherein the peg and the drive finger are arranged so that the co-operation between the peg and the drive finger leads to the movable jaw provided with the drive finger being moved from the closed position to the open position.

4. An installation according to claim 2, wherein the peg and the drive finger are arranged in such a manner that the co-operation between the peg and the drive finger causes the movable jaw provided with the drive finger to be blocked in the closed position.

5. An installation according to claim 2, wherein the free end of the movable jaw forms the drive finger.

6. An installation according to claim 2, wherein the peg is arranged on a free end of the stationary jaw.

7. An installation according to claim 2, wherein the peg extends vertically from the stationary jaw on which it is arranged.

8. An installation for treating containers, the installation comprising at least:
   a first platform having at least a first holder device comprising a first pair of jaws; and
   a second platform having at least a second holder device comprising a second pair of jaws;
   each pair of jaws comprising a stationary jaw, a movable jaw movable between a closed position for holding a container and an open position for releasing the container, and a resilient element arranged to urge the movable jaw towards the closed position, the installation being characterized in that the two pairs of jaws are provided with co-operation means to enable them, in operation, to transfer a container from one platform to another by co-operation between the pairs of jaws, the co-operation means being configured so that one of the pairs of jaws can act on the movement of the movable jaw of the other pair of jaws relative to the corresponding stationary jaw;
   wherein the co-operation means comprise a plane projection that is arranged on the stationary jaw of one of the pairs of jaws and a drive finger that is arranged on the movable jaw of the other pair of jaws in such a manner that the projection comes into contact with the drive finger in the vicinity of a point of tangency between the platforms.

9. An installation according to claim 8, wherein the projection and the drive finger are arranged in such a manner that the co-operation between the projection and the drive finger causes the movable jaw provided with the drive finger to move from the closed position to the open position.

10. An installation according to claim 1, wherein the stationary jaw is made integrally with the corresponding platform.

11. An installation according to claim 1, wherein each holder device is fastened to a bottom face of the corresponding platform, the top face of said platform, opposite from the bottom face, sloping down towards the corresponding holder device.

12. An installation according to claim 1, wherein the resilient element is a leaf spring having one end portion secured to the stationary jaw and another end portion secured to the movable jaw in order to carry the movable jaw.

* * * * *